US012525248B2

(12) United States Patent
Cho et al.

(10) Patent No.: US 12,525,248 B2
(45) Date of Patent: Jan. 13, 2026

(54) APPARATUS FOR ENCODING AND DECODING AUDIO SIGNAL AND METHOD OF OPERATION THEREOF

(71) Applicant: Electronics and Telecommunications Research Institute, Daejeon (KR)

(72) Inventors: Byeongho Cho, Daejeon (KR); Seung Kwon Beack, Daejeon (KR); Jongmo Sung, Daejeon (KR); Tae Jin Lee, Daejeon (KR); Woo-Taek Lim, Daejeon (KR); Inseon Jang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 171 days.

(21) Appl. No.: 18/349,680

(22) Filed: Jul. 10, 2023

(65) Prior Publication Data

US 2024/0055009 A1 Feb. 15, 2024

(30) Foreign Application Priority Data

Aug. 11, 2022 (KR) ........................ 10-2022-0100328
Feb. 9, 2023 (KR) ........................ 10-2023-0017122

(51) Int. Cl.
*G10L 19/032* (2013.01)
*G10L 19/04* (2013.01)

(52) U.S. Cl.
CPC ............ *G10L 19/032* (2013.01); *G10L 19/04* (2013.01)

(58) Field of Classification Search
CPC .............................. G10L 19/032; G10L 19/04
See application file for complete search history.

(56) References Cited

U.S. PATENT DOCUMENTS 6,889,185 B1 * 5/2005 McCree ................ G10L 19/038 704/E19.017
9,311,926 B2 * 4/2016 Sung ....................... G10L 19/06

(Continued)

FOREIGN PATENT DOCUMENTS

KR 10-1757344 7/2017
KR 10-2426033 7/2022

OTHER PUBLICATIONS

Jo et al., "Modified unrestricted polar quantization with the psychoacoustic parameter for audio coding", ICA, Oct. 2022, 8 total pages.

(Continued)

*Primary Examiner* — Shaun Roberts
(74) *Attorney, Agent, or Firm* — KILE PARK REED & HOUTTEMAN PLLC

(57) ABSTRACT

Provided are an apparatus for encoding an audio signal and a method of an operation thereof. An audio signal encoding method includes obtaining quantized linear prediction (LP) coefficients by performing a linear predictive coding (LPC) analysis and quantization on an input audio signal, generating a reference signal by applying discrete Fourier transform (DFT) to the input audio signal, obtaining LP residual coefficients from the reference signal, scaling magnitudes of the LP residual coefficients using the quantized LP coefficients and the reference signal, and quantizing phases of the LP residual coefficients and the scaled magnitudes of the LP residual coefficients.

15 Claims, 7 Drawing Sheets

130

(56) References Cited

U.S. PATENT DOCUMENTS

| | | | | |
|---|---|---|---|---|
| 9,711,150 | B2 * | 7/2017 | Beack | G10L 19/008 |
| 10,325,609 | B2 * | 6/2019 | Moriya | G10L 19/13 |
| 2008/0126084 | A1 * | 5/2008 | Lee | G10L 19/09<br>704/219 |
| 2009/0319278 | A1 * | 12/2009 | Yoon | G10L 19/0212<br>704/500 |
| 2013/0332153 | A1 * | 12/2013 | Markovic | G10L 25/78<br>704/219 |
| 2017/0178649 | A1 * | 6/2017 | Sung | G10L 19/032 |
| 2017/0337929 | A1 | 11/2017 | Beack et al. | |
| 2020/0243099 | A1 | 7/2020 | Beack et al. | |

OTHER PUBLICATIONS

Wu et al., "Design of Optimal Entropy-Constrained Unrestricted Polar Quantizer for Bivariate Circularly Symmetric Sources", IEEE Transactions on Communications, May 2018, pp. 2169-2180, vol. 66, No. 5.

* cited by examiner

APPARATUS FOR ENCODING AND DECODING AUDIO SIGNAL AND METHOD OF OPERATION THEREOF

CROSS-REFERENCE TO RELATED APPLICATION

This application claims the benefit of Korean Patent Application No. 10-2022-0100328 filed on Aug. 11, 2022, and Korean Patent Application No. 10-2023-0017122, filed on Feb. 9, 2023, in the Korean Intellectual Property Office, the entire disclosures of which are incorporated herein by reference for all purposes.

BACKGROUND

1. Field of the Invention

One or more embodiments relate to an apparatus for encoding and decoding an audio signal and a method of an operation thereof.

2. Description of the Related Art

In the audio coding techniques field, the main target of quantization may be a real value generated from modified discrete cosine transform (MDCT) and/or a complex value generated from discrete Fourier transform (DFT).

For the quantization of MDCT coefficients, a method of combining scalar quantization with entropy coding may be used and for the quantization of DFT coefficients, rectangular quantization (RQ) and/or polar quantization (PQ) may be used. RQ may be a method of quantizing a real part and an imaginary part of coefficients and PQ may be a method of quantizing magnitudes and phases of coefficients.

The above description is information the inventor(s) acquired during the course of conceiving the present disclosure, or already possessed at the time, and is not necessarily art publicly known before the present application was filed.

SUMMARY

Embodiments provide an audio signal encoding method that is improved perceptually by an encoder quantizing the magnitudes and phases of linear prediction (LP) coefficients based on discrete Fourier transform (DFT).

However, the technical goal is not limited to the above-mentioned technical goal, and other technical goals may exist.

According to an aspect, provided is an audio signal encoding method including obtaining quantized linear prediction (LP) coefficients corresponding to an input audio signal, obtaining LP residual coefficients based on a reference signal obtained from the input audio signal, scaling magnitudes of the LP residual coefficients using the quantized LP coefficients and the reference signal, and quantizing phases of the LP residual coefficients and the scaled magnitudes of the LP residual coefficients.

The obtaining of the LP residual coefficients may include obtaining the LP residual coefficients using frequency domain noise shaping (FDNS) from the reference signal.

The scaling of the magnitudes of the LP residual coefficients may include obtaining a first subband gain based on the LP residual coefficients and a bit constraint corresponding to a subband, generating a second subband gain from the first subband gain using the reference signal and the quantized LP coefficients, and scaling the magnitudes of the LP residual coefficients using the second subband gain.

The generating of the second subband gain may include scaling the magnitudes using the first subband gain, generating a test signal using the magnitudes scaled using the first subband gain and the quantized LP coefficients, obtaining a normalized short-time distorted block corresponding to the subband using the test signal and the reference signal, and generating the second subband gain by changing the first subband gain based on the normalized short-time distorted block.

The generating of the test signal may include obtaining quantized magnitudes by quantizing the magnitudes scaled using the first subband gain, and generating the test signal using the quantized magnitudes and the quantized LP coefficients.

The obtaining of the quantized magnitudes may include quantizing the magnitudes scaled using the first subband gain through a first quantization or a second quantization based on a result of comparison between the magnitudes scaled using the first subband gain and a threshold value.

The quantizing of the phases of the LP residual coefficients and the scaled magnitudes of the LP residual coefficients may include generating quantized magnitudes by quantizing the scaled magnitudes based on a result of comparison between the scaled magnitudes and a threshold value, determining a number of cells for phase quantization based on the quantized magnitudes, and quantizing the phases based on the determined number of cells.

The audio signal encoding method may further include encoding the quantized phases and the quantized magnitudes.

According to another aspect, provided is an audio signal decoding method including generating magnitudes of first linear prediction (LP) residual coefficients and phases of the first LP residual coefficients by decoding a coded audio signal, obtaining second LP residual coefficients by scaling the magnitudes of the LP residual coefficients based on a subband gain used for generating the coded audio signal from an original audio signal, generating a frequency domain signal corresponding to the original audio signal using the second LP residual coefficients and quantized LP coefficients corresponding to the original audio signal, and outputting a time domain signal corresponding to the frequency domain signal.

The subband gain may include a second subband gain generated by changing a first subband gain based on a normalized short-time distorted block, wherein the first subband gain is obtained based on LP residual coefficients obtained based on a reference signal obtained from the original audio signal and a bit constraint corresponding to a subband.

The normalized short-time distorted block may be obtained using the reference signal and a test signal generated based on the reference signal.

The reference signal may be generated through Fourier transform of the original audio signal, and the test signal is generated based on the reference signal and LP coefficients corresponding to the original audio signal.

According to another aspect, provided is an apparatus for decoding an audio signal, the apparatus including a memory configured to store instructions, and a processor electrically connected to the memory and configured to execute the instructions, wherein the processor may be configured to control a plurality of operations, when the instructions are executed by the processor, wherein the plurality of operations may include obtaining quantized linear prediction (LP)

coefficients corresponding to an input audio signal, obtaining LP residual coefficients based on a reference signal obtained from the input audio signal, scaling magnitudes of the LP residual coefficients using the quantized LP coefficients and the reference signal, and quantizing phases of the LP residual coefficients and the scaled magnitudes of the LP residual coefficients.

The obtaining of the LP residual coefficients may include obtaining the LP residual coefficients using frequency domain noise shaping (FDNS) from the reference signal.

The scaling of the magnitudes may include obtaining a first subband gain based on the LP residual coefficients and a bit constraint corresponding to a subband, generating a second subband gain from the first subband gain using the reference signal and the quantized LP coefficients, and scaling the magnitudes using the second subband gain.

The generating of the second subband gain may include scaling the magnitudes using the first subband gain, generating a test signal using the magnitudes scaled using the first subband gain and the quantized LP coefficients, obtaining a normalized short-time distorted block corresponding to the subband using the test signal and the reference signal, and generating the second subband gain by changing the first subband gain based on the normalized short-time distorted block.

The generating of the test signal may include obtaining quantized magnitudes by quantizing the magnitudes scaled using the first subband gain, and generating the test signal using the quantized magnitudes and the quantized LP coefficients.

The obtaining of the quantized magnitudes may include quantizing the magnitudes scaled using the first subband gain through a first quantization or a second quantization based on a result of comparison between the magnitudes scaled using the first subband gain and a threshold value.

The quantizing of the phases of the LP residual coefficients and the scaled magnitudes of the LP residual coefficients may include generating quantized magnitudes by quantizing the scaled magnitudes based on a result of comparison between the scaled magnitudes and a threshold value, determining a number of cells for phase quantization based on the quantized magnitudes, and quantizing the phases based on the determined number of cells.

The plurality of operations may further include encoding the quantized phases and the quantized magnitudes.

Additional aspects of embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
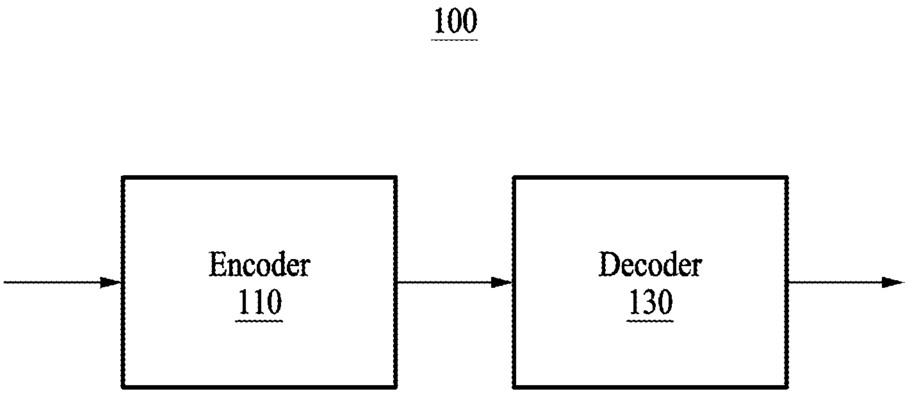
FIG. 1 is a diagram illustrating an audio signal encoding/decoding system according to an embodiment.

The following structural or functional descriptions of embodiments described herein are merely intended for the purpose of describing the embodiments described herein and may be implemented in various forms. However, it should be understood that these embodiments are not construed as limited to the illustrated forms.

Various modifications may be made to the embodiments. Here, the embodiments are not construed as limited to the disclosure and should be understood to include all changes, equivalents, and replacements within the idea and the technical scope of the disclosure.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure.

When it is mentioned that one component is "connected" or "accessed" to another component, it may be understood that the one component is directly connected or accessed to another component or that still other component is interposed between the two components.

The terminology used herein is for the purpose of describing particular embodiments only and is not to be limiting of the embodiments. As used herein, the singular forms "a," "an," and "the" are intended to include the plural forms as well, unless the context clearly indicates otherwise. As used herein, each of such phrases as "A or B", "at least one of A and B", "at least one of A or B", "A, B or C", "at least one of A, B and C", and "at least one of A, B, or C", may include any one of, or all possible combinations of the items enumerated together in a corresponding one of the phrases. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

As used in connection with embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

The term '-unit' used in the present disclosure refers to a software or a hardware component such as a field programmable gate array (FPGA) or an ASIC, and '-unit' performs certain roles. However, '-unit' is not limited to a software or a hardware. The term '-unit' may be configured to be in an addressable storage medium and may be configured to reproduce one or more processors. For example, '-unit' may include components such as software components, object-oriented software components, class components, and task components, in addition to processes, functions, properties, procedures, subroutines, segments of program codes, drivers, firmware, microcode, circuitry, data, databases, data structures, tables, arrays, and variables. Functions provided within the components and '-units' may be combined into a smaller number of components and '-units' or further separated into additional components and '-units'. Besides, components and 'units' may be implemented to play one or more central processing units (CPUs) in a device or a secure multimedia card. In addition, '-unit' may include one or more processors.

Hereinafter, embodiments will be described in detail with reference to the accompanying drawings. When describing the embodiments with reference to the accompanying drawings, regardless of drawing numerals, like reference numerals refer to like components and a repeated description related thereto will be omitted.

FIG. 1 is a diagram illustrating an audio signal encoding/decoding system according to an embodiment.

Referring to FIG. 1, according to an embodiment, an apparatus for encoding/decoding an audio signal may include an encoder 110 and a decoder 130.

The encoder 110 may perform quantization and entropy coding on an input signal (e.g., an input audio signal). The encoder 110 is described in detail with reference to FIG. 2.

The decoder 130 may reconstruct an input signal (not illustrated) by performing entropy decoding and inverse quantization on a signal coded by the encoder 110. The decoder 130 is described in detail with reference to FIG. 3.

Figure 2:
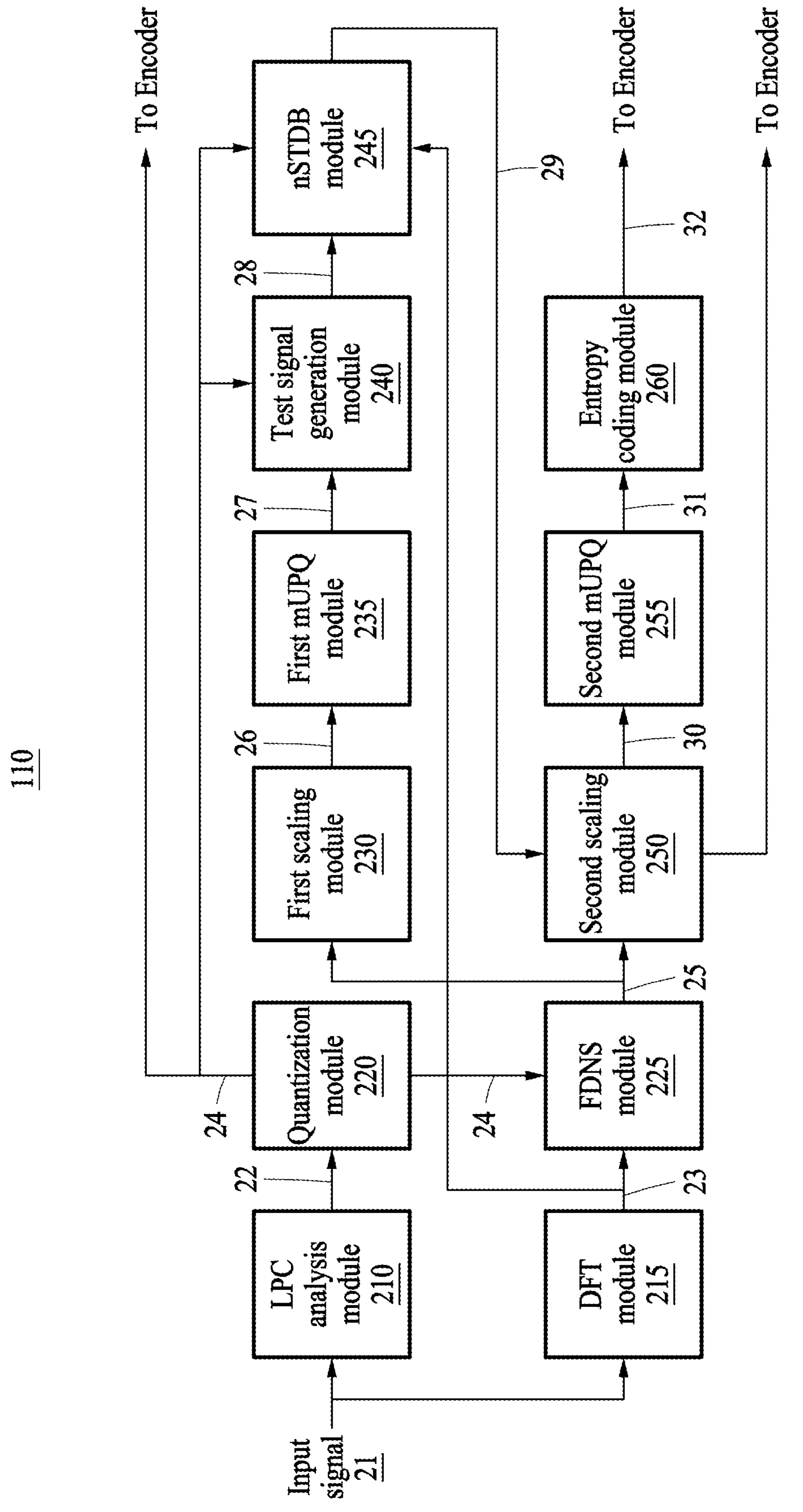
FIG. 2 is a diagram illustrating an encoder according to an embodiment.

FIG. 2 is a diagram illustrating an encoder according to an embodiment.

Referring to FIG. 2, according to an embodiment, the encoder 110 may include a linear predictive coding (LPC) analysis module 210, a discrete Fourier transform (DFT) module 215, a quantization module 220, a frequency domain noise shaping (FDNS) module 225, a first scaling module 230, a first modified unrestricted polar quantization (mUPQ) module 235, a test signal generation module 240, a normalized short-time distorted block (nSTDB) module 245, a second scaling module 250, a second mUPQ module 255, and an entropy coding module 260.

The LPC analysis module 210 may obtain linear prediction (LP) coefficients 22 corresponding to an input signal 21 (e.g., an input audio signal) by performing LPC analysis on the input signal 21. According to an embodiment, the LP coefficients 22 may be LP coefficients weighted by a predefined weighting factor (e.g., 0.92) or LP coefficients with no weighting factor applied thereto. Hereinafter, for the convenience of description, an example is described when the degree of LPC is 16. However, this example is only one embodiment for the description, and the scope of the present disclosure should not be construed as being limited thereto.

The DFT module 215 may transform the input signal 21 into a reference signal 23 by applying Fourier transform (e.g., DFT) to the input signal 21. The reference signal 23 may be a frequency domain signal.

The quantization module 220 may obtain quantized LP coefficients 24 corresponding to the input signal 21 by quantizing the LP coefficients 22. The LP coefficients 22 may be transformed into line spectral frequency (LSF) parameters and may be quantized using a pre-trained 2 stage vector quantization model.

The FDNS module 225 may flatten the spectral energy of the frequency domain signal. The FDNS module 225 may output LP residual coefficients 25 using the reference signal 23 and the quantized LP coefficients 24. The LP residual coefficients 25 may include a plurality of LP residual coefficients corresponding to a plurality of subbands. In other words, the LP residual coefficients 25 may be grouped based on the plurality of subbands. The number of subbands and the bandwidth of the subbands may be determined based on the characteristics of the input signal 21. Hereinafter, for the convenience of description, an example is described when "8" subbands exist. Upper thresholds of the "8" subbands may be set as [0.5 kHz, 1.12 kHz, 1.74 kHz, 2.5 kHz, 3.24 kHz, 4.12 kHz, 5.12 kHz, 6.4 kHz] but are not limited thereto.

The first scaling module 230 may calculate subband gains (e.g., a first subband gain) for the respective subbands based on the LP residual coefficients 25 corresponding to the respective subbands and a pre-defined bit constraint. The bit constraint may be set variously. For example, the bit constraint may be set as [50, 37, 34, 25, 21, 21, 21, 21] but is not limited thereto. A subband gain may be calculated using a scalar quantization (SQ) gain function included in an audio codec standard (e.g., moving picture experts group (MPEG) unified speech and audio coding (USAC)). For example, the higher the bit constraint, the smaller the subband gain may be. The first scaling module 230 may obtain scaled magnitudes 26 of the LP residual coefficients by dividing the LP residual coefficients 25 corresponding to the respective subbands by the subband gains corresponding to the respective subbands.

The first mUPQ module 235 may quantize the scaled magnitudes 26 of the LP residual coefficients. The first mUPQ module 235 may quantize the scaled magnitudes 26 of the LP residual coefficients using unrestricted polar quantization (UPQ). For example, if the scaled magnitudes 26 of the LP residual coefficients are greater than the highest threshold value of the threshold values, the corresponding magnitude index may be specified to the cell with the highest number and the scaled magnitudes 26 of the LP residual coefficients may be quantized by nonlinear quantization (e.g., a first quantization). This may be expressed as in Equation 1 below.

$$\hat{A}=\lfloor A^{3/4}+0.5\rfloor^{4/3}. \quad \text{[Equation 1]}$$

If the scaled magnitudes 26 of the LP residual coefficients are smaller than the highest threshold value of the threshold values, the scaled magnitudes 26 of the LP residual coefficients may be quantized by entropy-constrained unrestricted polar quantization (ECUPQ) (e.g., a second quantization).

The test signal generation module 240 may generate a test signal 28 using quantized magnitudes 27 and the quantized LP coefficients 24.

The nSTDB module 245 may calculate an nSTDB 29 for calibrating the subband gain (e.g., the first subband gain) calculated by the first scaling module 230. The nSTDB 29 may be a modified average distorted block (ADB) among model output variables (MOVs) of perceptual evaluation of audio quality (PEAQ). The nSTDB 29 may be generated based on excitation patterns of the reference signal 23 and the test signal 28. The nSTDB 29 may be calculated by averaging the detection probability ($p_c[k, n]$) and the number of steps above the threshold vale) ($q_c[k, n]$). This may be expressed as in Equation 2 below.

$$P[b, n] = 1 - \prod_{k \in \mathscr{B}(b)} (1 - p_c[k, n]), \quad Q[b, n] = \sum_{k \in \mathscr{B}(b)} q_c[k, n]. \qquad \text{[Equation 2]}$$

Here, k may represent the Bark scale index of a fast Fourier transform (FFT)-based PEAQ model and $\mathscr{B}$ (b) (b) may represent a set of Bark scale indices within the b-th subband. $p_c[k, n]$ and $q_c[k, n]$ may be calculated in the same method as the FFT-based PEAQ model.

$$STDB[b, n] = \begin{cases} 0 & P[b, n] \le 0.5, \\ \log_{10} Q[b, n] & P[b, n] > 0.5 \text{ and } Q[b, n] > 0, \\ -0.5 & P[b, n] > 0.5 \text{ and } Q[b, n] = 0, \end{cases} \qquad \text{[Equation 3]}$$

Here, b may represent an index of the subband and n may represent an index of a frame. The nSTDB module 245 may normalize the STDB using upper and lower bounds of an ADB.

The second scaling module 250 may determine coefficients for calibrating the subband gain (e.g., the first subband gain) based on the nSTDB 29 for each subband and/or each frame. A method of determining subband gain calibration factors of the second scaling module 250 is described in detail with reference to FIG. 4. The second scaling module 250 may scale the magnitudes of the LP residual coefficients 25 using a calibrated subband gain (e.g., a second subband gain).

The second mUPQ module 255 may quantize phases 30 of the LP residual coefficients 25 and the scaled magnitudes 30 of the LP residual coefficients 25. The second mUPQ module 255 may quantize the scaled magnitudes 30 in the same method as the first mUPQ module 235. The second mUPQ module 255 may determine the number of cells for phase quantization based on the quantized magnitudes 31. For example, the number of cells for phase quantization may be determined based on powers of 2, such as [1, 8, 16, 16, 32, 32, 64, 64] but is not limited thereto.

The entropy coding module 260 may output a coded signal 32 by encoding (e.g., entropy coding) the quantized magnitudes 31 and quantized phases 31.

Figure 3:
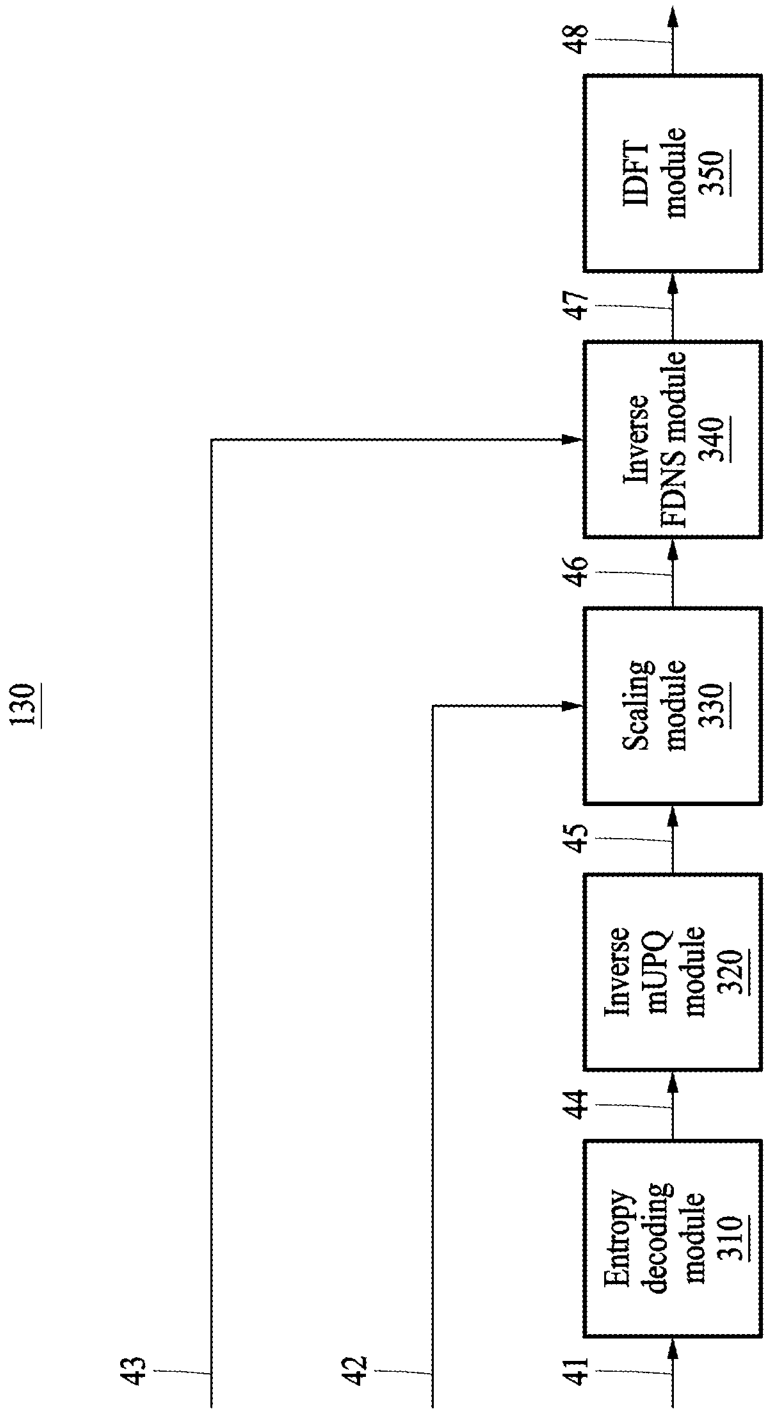
FIG. 3 is a diagram illustrating a decoder according to an embodiment.

FIG. 3 is a diagram illustrating a decoder according to an embodiment.

Referring to FIG. 3, according to an embodiment, the decoder 130 may include an entropy decoding module 310, an inverse mUPQ module 320, a scaling module 330, an inverse FDNS module 340, and an inverse discrete Fourier transform (IDFT) module 350.

The entropy decoding module 310 may obtain quantized magnitudes 44 (e.g., the quantized magnitudes 31 of the LP residual coefficients of FIG. 2) of the LP residual coefficients and quantized phases 44 (e.g., the quantized phases 31 of the LP residual coefficients of FIG. 2) of the LP residual coefficients, by decoding (e.g., entropy decoding) a coded signal 41 (e.g., the coded signal 32 of FIG. 2) received from an encoder (e.g., the encoder 110 of FIGS. 1 and 2). The entropy decoding module 310 may perform an inverse operation of an entropy coding module (e.g., the entropy coding module 260 of FIG. 2). Accordingly, detailed descriptions thereof are omitted.

The inverse mUPQ module 320 may obtain magnitudes 45 of the first LP residual coefficients and phases 45 of the first LP residual coefficients, by performing inverse quantization on the quantized magnitudes 44 and the quantized phases 44. The magnitudes 45 of the first LP residual coefficients and the phases 45 of the first LP residual coefficients may correspond to an output (the phases and the scaled magnitudes 30 of FIG. 2) of the second scaling module (e.g., the second scaling module 250 of FIG. 2) in the encoding operation. The operation of the inverse mUPQ module 320 may be the inverse operation of the mUPQ module (e.g., the second mUPQ module 255 of FIG. 2) in the encoding operation. Accordingly, detailed descriptions thereof are omitted.

The scaling module 330 may obtain second LP residual coefficients 46 by scaling the magnitudes 45 of the first LP residual coefficients using information 42 (e.g., the second subband gain and/or calibration factors received from the second scaling module 250 of FIG. 2) received from the encoder 110. The second LP residual coefficients 46 may correspond to the LP residual coefficients (e.g., the LP residual coefficients 25 of FIG. 2) in the encoding operation. The scaling module 330 may perform an inverse operation of the scaling module (e.g., the second scaling module 250 of FIG. 2). Accordingly, detailed descriptions thereof are omitted.

The inverse FDNS module 340 may obtain a frequency domain signal 47 using quantized LP coefficients 43 (e.g., the quantized LP coefficients 24 of FIG. 2) and the second LP residual coefficients 46 received from the encoder 110. The frequency domain signal 47 may correspond to a reference signal (e.g., the reference signal 23 of FIG. 2) in the encoding operation. The inverse FNDS module 340 may perform an inverse operation of the FNDS module (e.g., the FNDS module 225 of FIG. 2). Accordingly, detailed descriptions thereof are omitted.

The IDFT module 350 may obtain a time domain signal 48 by applying inverse Fourier transform (e.g., IDFT) to the frequency domain signal 47. The time domain signal 48 may be an input signal (e.g., a reconstructed signal corresponding to the input signal 21 of FIG. 2). The IDFT module 350 may perform an inverse operation of the DFT module (e.g., the DFT module 215 of FIG. 2). Accordingly, repeated descriptions thereof are omitted.

When the encoder 110 encodes information (e.g., the information 42 and/or the quantized LP coefficients 43) and transmits the encoded information to the decoder 130, the decoder 130 may further include one or more modules (not illustrated) for decoding each piece of information.

Figure 4:
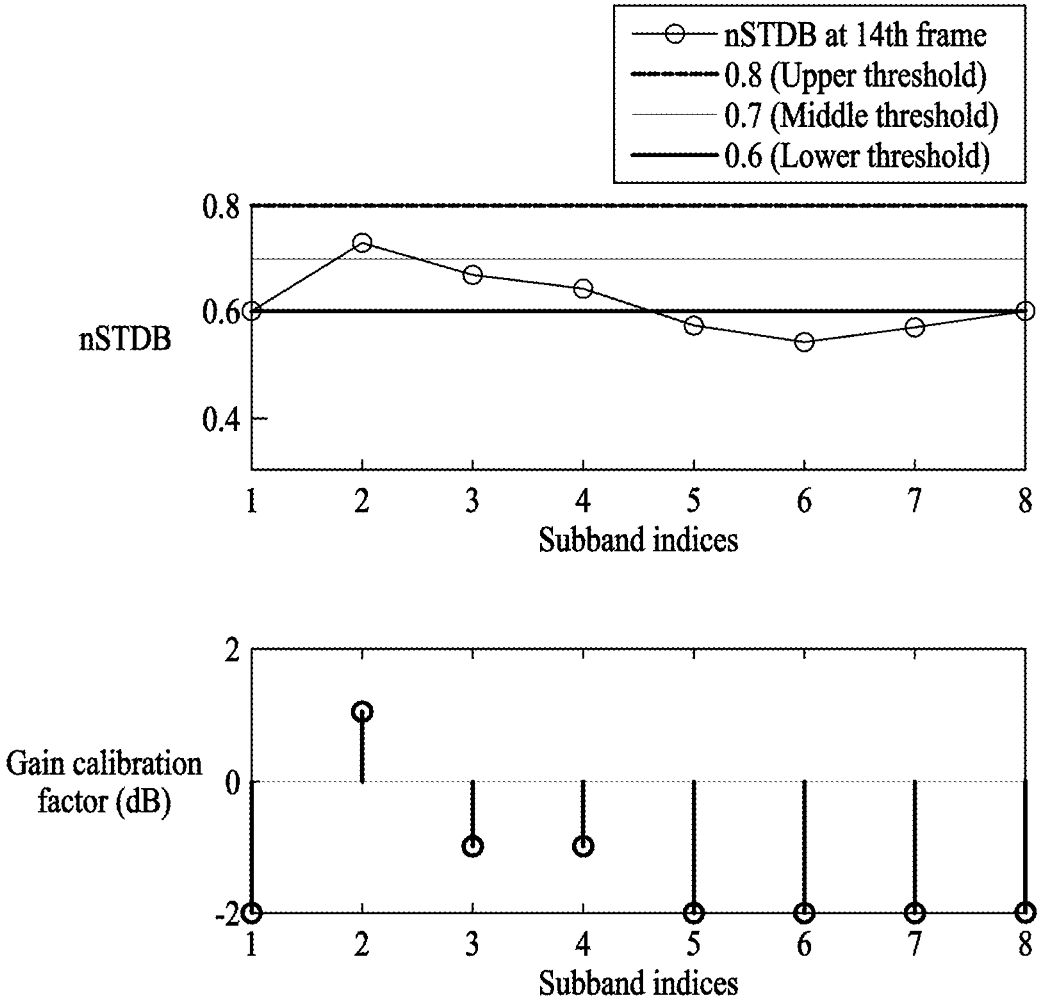
FIG. 4 is a diagram illustrating a method of determining subband gain calibration factors, according to an embodiment.

FIG. 4 is a diagram illustrating subband gain calibration factors according to an embodiment.

Referring to FIG. 4, according to an embodiment, a scaling module (e.g., the second scaling module 250 of FIG. 2) may determine subband gain calibration factors based on an nSTDB (e.g., the nSTDB 29 of FIG. 2) corresponding to each subband. For example, the subband gain calibration factors may be determined based on a result of comparison between the nSTDB 29 and a threshold value. The threshold value for the nSTDB 29 may include one or more threshold values. For example, the threshold value may include an upper threshold, a middle threshold, and a lower threshold.

However, the threshold values and subband gain calibration factors illustrated in FIG. 4 are examples for description and are not limited thereto.

Figure 5:
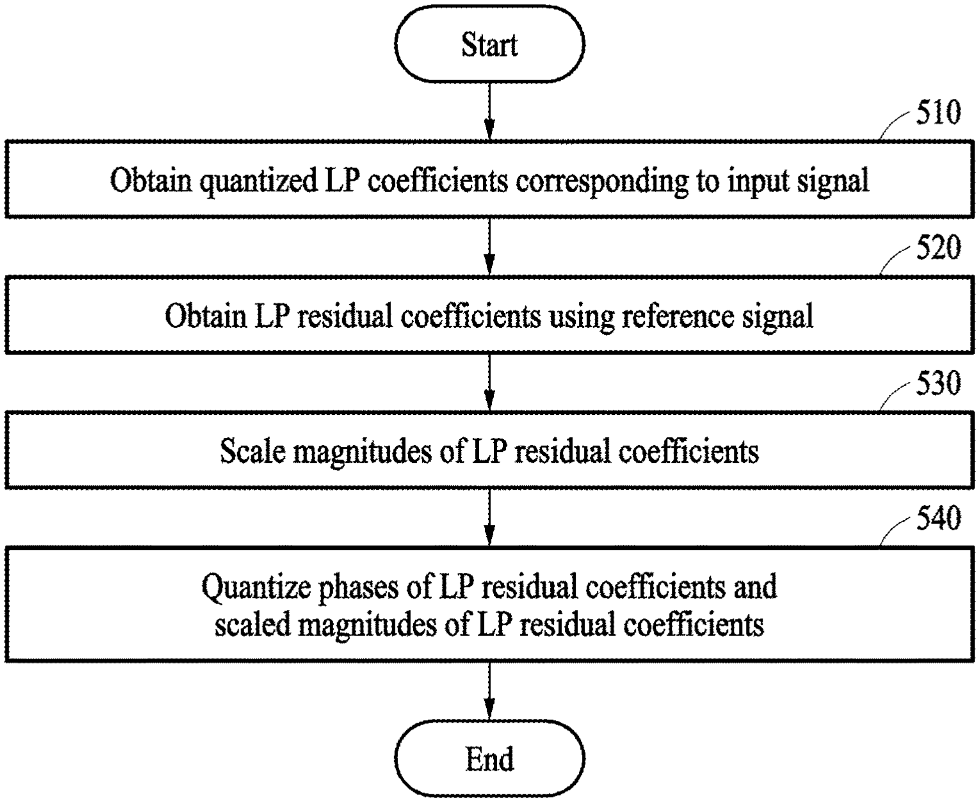
FIG. 5 is a flowchart illustrating an operation of an encoder, according to an embodiment.

FIG. 5 is a flowchart illustrating an operation of an encoder, according to an embodiment.

Referring to FIG. 5, according to an embodiment, operations 510 to 540 may be substantially the same as the operations of the encoder (e.g., the encoder 110 of FIGS. 1 and 2) described with reference to FIGS. 1, 2, and 4. Accordingly, detailed descriptions thereof are omitted. According to an embodiment, operations 510 to 540 may be sequentially performed but are not limited thereto. For example, the order of operations 510 and 520 may be reversed, or operations 510 and 520 may be performed in parallel.

In operation 510, the encoder 110 may perform LPC analysis and quantization on an input signal (e.g., the input signal 21 of FIG. 2) and may obtain quantized LP coefficients (e.g., the quantized LP coefficients 24 of FIG. 2) corresponding to the input signal (e.g., the input signal 21 of FIG. 2).

In operation 520, the encoder 110 may obtain LP residual coefficients (e.g., the LP residual coefficients 25 of FIG. 2) using a reference signal (e.g., the reference signal 23 of FIG. 2).

In operation 530, the encoder 110 may scale magnitudes of the LP residual coefficients 25 using the quantized LP coefficients 24 and the reference signal 23.

In operation 540, the encoder 110 may quantize the phases of the LP residual coefficients 25 and the scaled magnitudes of the LP residual coefficients 25.

Figure 6:
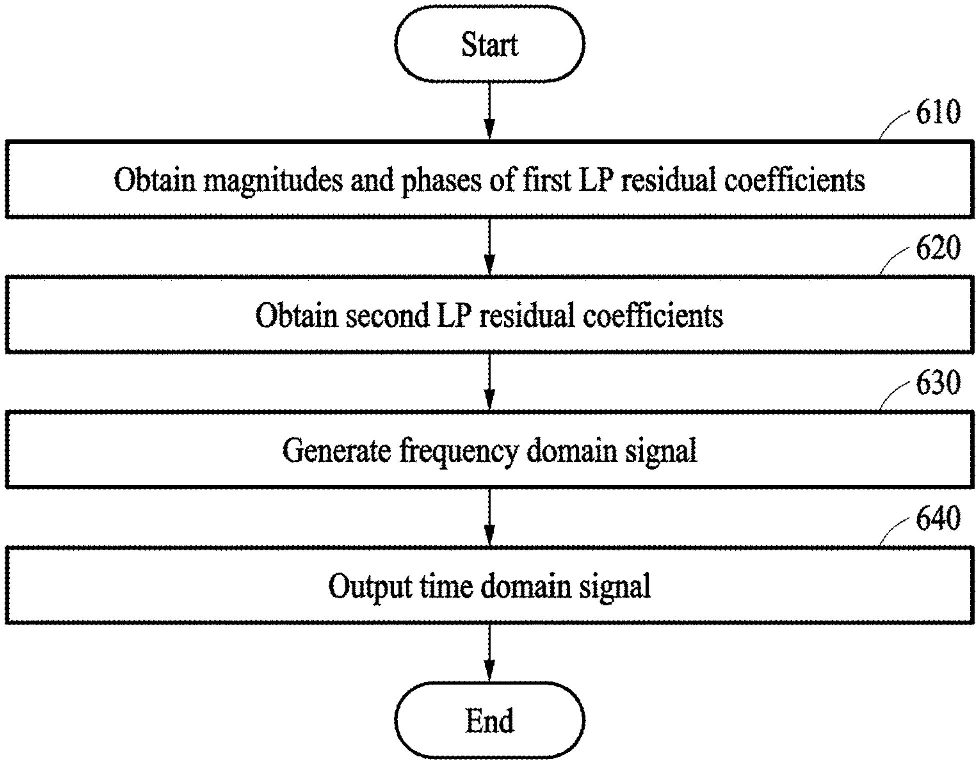
FIG. 6 is a flowchart illustrating an operation of a decoder, according to an embodiment.

FIG. 6 is a flowchart illustrating an operation of a decoder, according to an embodiment. Referring to FIG. 6, according to an embodiment, operations 610 to 640 may be substantially the same as the operations of the decoder (e.g., the decoder 130 of FIGS. 1 and 3) described with reference to FIGS. 1 and 3. Accordingly, detailed descriptions thereof are omitted. According to an embodiment, operations 610 to 640 may be sequentially performed but are not limited thereto. For example, two or more operations may be performed in parallel.

In operation 610, the decoder 130 may decode (e.g., entropy decoding) a coded audio signal (e.g., the coded signal 32 of FIG. 1 and the coded signal 41 of FIG. 3) to obtain magnitudes of first LP residual coefficients (e.g., the magnitudes 45 of the first LP residual coefficients in FIG. 3) and phases of first LP residual coefficients (e.g., the phases 45 of the first LP residual coefficients in FIG. 3).

In operation 620, the decoder 130 may obtain second LP residual coefficients (e.g., the second LP residual coefficients 46 of FIG. 3) by scaling the magnitudes 45 of the first LP residual coefficients based on the subband gain (e.g., the second subband gain).

In operation 630, the decoder 130 may obtain a frequency domain signal (e.g., the frequency domain signal 47 of FIG. 3) from the original audio signal (e.g., the input signal 21 of FIG. 2) by using the second LP residual coefficients 46 and the quantized LP coefficients (e.g., the quantized LP coefficients 24 of FIG. 2 and the quantized LP coefficients 43 of FIG. 3) corresponding to the original audio signal (e.g., the input signal 21).

In operation 640, the decoder 130 may output a time domain signal (e.g., the time domain signal 48 of FIG. 3) corresponding to the frequency domain signal 47.

Figure 7:
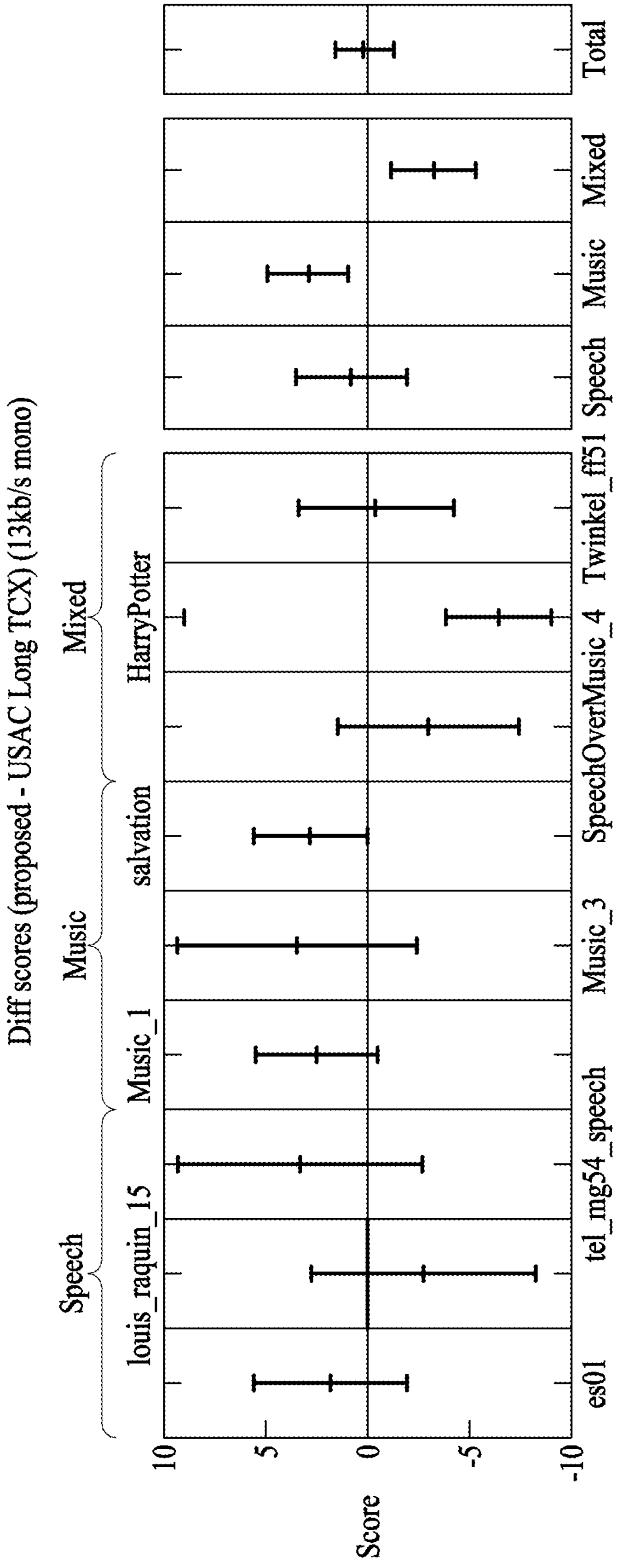
FIG. 7 is a diagram illustrating the performance of an encoder according to an embodiment.

FIG. 7 is a diagram illustrating the performance of an encoder according to an embodiment.

FIG. 7 may be a diagram illustrating a difference in multiple stimuli with hidden reference and anchor (MUSHRA) test scores for a method according to an embodiment and a modified discrete cosine transform (MDCT)-based transform coded excitation (TCX) (e.g., MPEG USAC long TCX).

Referring to FIG. 7, according to an embodiment, an encoder (e.g., the encoder 110 of FIGS. 1 and 2) may provide a perceptually enhanced audio signal coding method.

Figure 8:
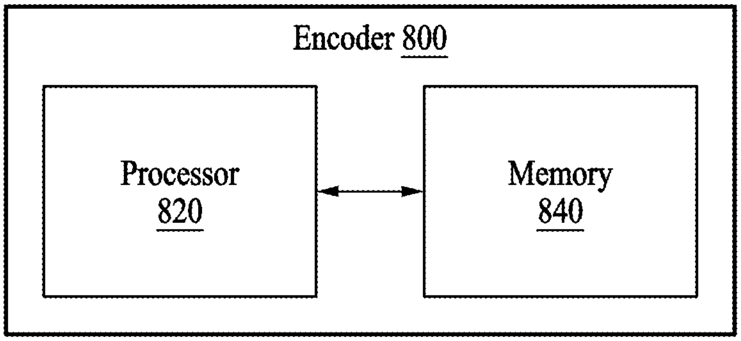
FIG. 8 is a schematic block diagram of an encoder according to an embodiment.

FIG. 8 is a schematic block diagram of an encoder according to an embodiment.

Referring to FIG. 8, according to an embodiment, an encoder 800 (e.g., the encoder 110 of FIGS. 1 and 2) may include a memory 840 and a processor 820.

The memory 840 may store instructions (or programs) that may be executed by the processor 820. For example, the instructions may include instructions for executing an operation of the processor 820 and/or an operation of each component of the processor 820.

The processor 820 may process data stored in the memory 840. The processor 820 may execute computer-readable code (e.g., software) stored in the memory 840 and instructions invoked by the processor 820.

The processor 820 may be a data processing unit implemented in hardware with a circuit having a physical structure for executing desired operations. For example, the desired operations may include code or instructions in a program.

For example, the data processing unit implemented in hardware may include a microprocessor, a central processing unit, a processor core, a multi-core processor, a multiprocessor, an ASIC, and an FPGA.

Operations performed by the processor 820 may be substantially the same as the operations of the encoder 110 described with reference to FIGS. 1, 2, 4, and 5. Accordingly, detailed descriptions thereof are omitted.

Figure 9:
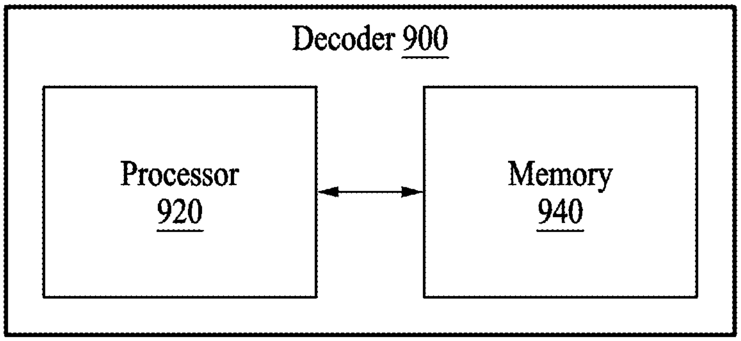
FIG. 9 is a schematic block diagram of a decoder according to an embodiment.

FIG. 9 is a schematic block diagram of a decoder according to an embodiment.

Referring to FIG. 9, according to an embodiment, a decoder 900 (e.g., the decoder 130 of FIGS. 1 and 3) may include a memory 940 and a processor 920.

The memory 940 may store instructions (or programs) that may be executed by the processor 920. For example, the instructions may include instructions for executing an operation of the processor 920 and/or an operation of each component of the processor 920.

The processor 920 may process data stored in the memory 940. The processor 920 may execute computer-readable code (e.g., software) stored in the memory 940 and instructions invoked by the processor 920.

The processor 920 may be a data processing unit implemented in hardware with a circuit having a physical structure for executing desired operations. For example, the desired operations may include code or instructions in a program.

For example, the data processing unit implemented in hardware may include a microprocessor, a central processing unit, a processor core, a multi-core processor, a multiprocessor, an ASIC, and an FPGA.

Operations performed by the processor 920 may be substantially the same as the operations of the decoder 130 described with reference to FIGS. 1, 3, and 6. Accordingly, detailed descriptions thereof are omitted.

The components described in the embodiments may be implemented by hardware components including, for example, at least one digital signal processor (DSP), a processor, a controller, an ASIC, a programmable logic element, such as an FPGA, other electronic devices, or combinations thereof. At least some of the functions or the processes described in the embodiments may be implemented by software, and the software may be recorded on a recording medium. The components, the functions, and the processes described in the embodiments may be implemented by a combination of hardware and software.

The examples described herein may be implemented using hardware components, software components and/or combinations thereof. A processing device may be implemented using one or more general-purpose or special purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described embodiments may be recorded in non-transitory computer-readable media including program instructions to implement various operations which may be performed by a computer. The media may also include, alone or in combination with the program instructions, data files, data structures, and the like. The program instructions recorded on the media may be those specially designed and constructed for the purposes of the embodiments, or they may be of the well-known kind and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The media may be transfer media such as optical lines, metal lines, or waveguides including a carrier wave for transmitting a signal designating the program command and the data construction. Examples of program instructions include both machine code, such as code produced by a compiler, and files containing higher level code that may be executed by the computer using an interpreter. The described hardware devices may be configured to act as one or more software modules in order to perform the operations of the above-described embodiments, or vice versa.

While this disclosure includes embodiments, it will be apparent to one of ordinary skill in the art that various changes in form and details may be made in these embodiments without departing from the spirit and scope of the claims and their equivalents. The embodiments described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An audio signal encoding method comprising:

obtaining quantized linear prediction (LP) coefficients corresponding to an input audio signal;

obtaining LP residual coefficients based on a reference signal obtained from the input audio signal;

obtaining a first subband gain based on the LP residual coefficients and a bit constraint corresponding to a subband;

generating a second subband gain from the first subband gain using the reference signal and the quantized LP coefficients;

scaling the magnitudes of the LP residual coefficients using the second subband gain; and quantizing phases of the LP residual coefficients and the scaled magnitudes of the LP residual coefficients, wherein the generating of the second subband gain comprises:

scaling the magnitudes using the first subband gain;

generating a test signal using the magnitudes scaled using the first subband gain and the quantized LP coefficients;

obtaining a normalized short-time distorted block corresponding to the subband using the test signal and the reference signal; and generating the second subband gain by changing the first subband gain based on the normalized short-time distorted block.

2. The audio signal encoding method of claim 1, wherein the obtaining of the LP residual coefficients comprises obtaining the LP residual coefficients using frequency domain noise shaping (FDNS) from the reference signal.

3. The audio signal encoding method of claim 1, wherein the generating of the test signal comprises:

obtaining quantized magnitudes by quantizing the magnitudes scaled using the first subband gain; and generating the test signal using the quantized magnitudes and the quantized LP coefficients.

4. The audio signal encoding method of claim 3, wherein the obtaining of the quantized magnitudes comprises quantizing the magnitudes scaled using the first subband gain through a first quantization or a second quantization based on a result of comparison between the magnitudes scaled using the first subband gain and a threshold value.

5. The audio signal encoding method of claim 1, wherein the quantizing of the phases of the LP residual coefficients and the scaled magnitudes of the LP residual coefficients comprises:
generating quantized magnitudes by quantizing the scaled magnitudes based on a result of comparison between the scaled magnitudes and a threshold value;
determining a number of cells for phase quantization based on the quantized magnitudes; and
quantizing the phases based on the determined number of cells.

6. The audio signal encoding method of claim 1, further comprising
encoding the quantized phases and the quantized magnitudes.

7. An audio signal decoding method comprising:
generating magnitudes of first linear prediction (LP) residual coefficients and phases of the first LP residual coefficients by decoding a coded audio signal;
obtaining second LP residual coefficients by scaling the magnitudes of the LP residual coefficients based on a subband gain used for generating the coded audio signal from an original audio signal;
generating a frequency domain signal corresponding to the original audio signal using the second LP residual coefficients and quantized LP coefficients corresponding to the original audio signal; and
outputting a time domain signal corresponding to the frequency domain signal,
wherein the subband gain comprises a second subband gain generated by changing a first subband gain based on a normalized short-time distorted block,
wherein the first subband gain is obtained based on LP residual coefficients obtained based on a reference signal obtained from the original audio signal and a bit constraint corresponding to a subband.

8. The audio signal decoding method of claim 7, wherein the normalized short-time distorted block is obtained using the reference signal and a test signal generated based on the reference signal.

9. The audio signal decoding method of claim 8, wherein the reference signal is generated through Fourier transform of the original audio signal, and
the test signal is generated based on the reference signal and LP coefficients corresponding to the original audio signal.

10. An apparatus for decoding an audio signal, the apparatus comprising:
a memory configured to store instructions; and
a processor electrically connected to the memory and configured to execute the instructions,
wherein the processor is configured to control a plurality of operations, when the instructions are executed by the processor,
wherein the plurality of operations comprises:
obtaining quantized linear prediction (LP) coefficients corresponding to an input audio signal;
obtaining LP residual coefficients based on a reference signal obtained from the input audio signal;
obtaining a first subband gain based on the LP residual coefficients and a bit constraint corresponding to a subband;
generating a second subband gain from the first subband gain using the reference signal and the quantized LP coefficients;
scaling the magnitudes using the second subband gain; and
quantizing phases of the LP residual coefficients and the scaled magnitudes of the LP residual coefficients,
wherein the generating of the second subband gain comprises:
scaling the magnitudes using the first subband gain;
generating a test signal using the magnitudes scaled using the first subband gain and the quantized LP coefficients;
obtaining a normalized short-time distorted block corresponding to the subband using the test signal and the reference signal; and
generating the second subband gain by changing the first subband gain based on the normalized short-time distorted block.

11. The apparatus of claim 10, wherein
the obtaining of the LP residual coefficients comprises obtaining the LP residual coefficients using frequency domain noise shaping (FDNS) from the reference signal.

12. The apparatus of claim 10, wherein
the generating of the test signal comprises:
obtaining quantized magnitudes by quantizing the magnitudes scaled using the first subband gain; and
generating the test signal using the quantized magnitudes and the quantized LP coefficients.

13. The apparatus of claim 12, wherein
the obtaining of the quantized magnitudes comprises quantizing the magnitudes scaled using the first subband gain through a first quantization or a second quantization based on a result of comparison between the magnitudes scaled using the first subband gain and a threshold value.

14. The apparatus of claim 10, wherein
the quantizing of the phases of the LP residual coefficients and the scaled magnitudes of the LP residual coefficients comprises:
generating quantized magnitudes by quantizing the scaled magnitudes based on a result of comparison between the scaled magnitudes and a threshold value;
determining a number of cells for phase quantization based on the quantized magnitudes; and
quantizing the phases based on the determined number of cells.

15. The apparatus of claim 10, wherein
the plurality of operations further comprises encoding the quantized phases and the quantized magnitudes.

* * * * *